United States Patent
Mi et al.

(10) Patent No.: US 10,298,057 B2
(45) Date of Patent: May 21, 2019

(54) DOUBLE-SIDED LCLC-COMPENSATED TOPOLOGY FOR CAPACITIVE POWER TRANSFER

(71) Applicant: THE REGENTS OF THE UNIVERSITY OF MICHIGAN, Ann Arbor, MI (US)

(72) Inventors: Chris Mi, Canton, MI (US); Hua Zhang, Westland, MI (US); Fei Lu, Westland, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 439 days.

(21) Appl. No.: 15/088,213

(22) Filed: Apr. 1, 2016

(65) Prior Publication Data

US 2016/0294217 A1  Oct. 6, 2016

Related U.S. Application Data

(60) Provisional application No. 62/141,437, filed on Apr. 1, 2015, provisional application No. 62/141,498, filed on Apr. 1, 2015.

(51) Int. Cl.
*H02J 50/05* (2016.01)
*H02J 50/90* (2016.01)
(Continued)

(52) U.S. Cl.
CPC .............. *H02J 50/05* (2016.02); *B60L 11/182* (2013.01); *H02J 7/025* (2013.01); *H02J 50/90* (2016.02)

(58) Field of Classification Search
CPC .................................. H02J 50/05; H02J 7/025
See application file for complete search history.

(56) References Cited

U.S. PATENT DOCUMENTS 4,764,723 A * 8/1988 Strid .................. G01R 1/07342
324/756.03
7,613,273 B2 * 11/2009 Beyerlein ................ A61B 6/56
361/143
(Continued)

FOREIGN PATENT DOCUMENTS

JP        2013126294 A      6/2013
JP  WO 2014148369 A1 *  9/2014  .............. H02J 17/00
(Continued)

OTHER PUBLICATIONS

Ricardo Fernandes, et.al., "Wireless Power Transmission Based on Resonant Electrical Coupling," Oct. 6-9, 2014, Proceedings of the 44th European Microwave Conference, pp. 17-20.*
(Continued)

*Primary Examiner* — Thienvu V Tran
*Assistant Examiner* — Pinping Sun
(74) *Attorney, Agent, or Firm* — Harness, Dickey & Pierce, P.L.C.

(57) ABSTRACT

A double-sided LCLC-compensated network is proposed for a capacitive power transfer (CPT) system. In one design, four metal plates are used to form two power transmitting and receiving capacitors and the LCLC network is used to compensate the capacitors. In the second design, two extra metal plates are used to couple with the previous four plates at the transmitting and receiving side, respectively, which forms the capacitor-integrated structure. The circuit parameter values are tuned to achieve zero voltage switching (ZVS) of the input side switches. There is also a CLLC topology proposed, which is a similar variation of LCLC circuit. A 3.3 kW input power capacitive power transfer prototype is designed and built. The experiment results show that the proposed CPT system can transfer 3.1 kW output (Continued)

power through an air gap distance of 70 mm with a dc-to-dc efficiency of 92.1%.

8 Claims, 18 Drawing Sheets

(51) Int. Cl.
*B60L 11/18* (2006.01)
*H02J 7/02* (2016.01)

(56) References Cited

U.S. PATENT DOCUMENTS

| | | | |
|---|---|---|---|
| 2002/0060609 A1* | 5/2002 | Huang | H01P 1/20345 331/2 |
| 2010/0184371 A1 | 7/2010 | Cook et al. | |
| 2010/0197251 A1 | 8/2010 | Lai | |
| 2011/0193416 A1 | 8/2011 | Campanella et al. | |
| 2012/0217926 A1 | 8/2012 | Yoon et al. | |
| 2012/0293020 A1 | 11/2012 | Lee | |
| 2014/0197710 A1 | 7/2014 | Ludois et al. | |
| 2014/0266035 A1* | 9/2014 | Cern | H02J 7/025 320/108 |

FOREIGN PATENT DOCUMENTS

| | | |
|---|---|---|
| KR | 20130096994 A | 9/2013 |
| WO | WO-20120172410 A1 | 12/2012 |
| WO | WO-2014148369 A1 | 9/2014 |

OTHER PUBLICATIONS

Michael Hutt, "Impedance Matching Networks," 2004, pp. 1-8.*
Michael Theodoridis, "Effective capacitive Power Transfer," Dec. 2012, IEEE Transactions on Power Electronics. vol. 27, No. 12, pp. 4906-4913.*
"A Unity-Power-Factor-IPT Pickup for High-Power Applications", N.A. Keeling et al, IEEE Transactions on Industrial Electronics, vol. 57, No. 2, Feb. 2010.
"ZCS LCC-Compensated Resonant Inverter for Inductive-Power-Transfer Application", Z. Pantic, et al., IEEE Transactions on Industrial Electronics, vol. 58, No. 8, Aug. 2011.

* cited by examiner

Front View

DOUBLE-SIDED LCLC-COMPENSATED TOPOLOGY FOR CAPACITIVE POWER TRANSFER

CROSS-REFERENCE TO RELATED APPLICATIONS

This application claims the benefit of U.S. Provisional Application No. 62/141,437 filed on Apr. 1, 2015 and U.S. Provisional Application No. 62/141,498 filed on Apr. 1, 2015. The entire disclosure of each of the above applications is incorporated herein by reference.

GOVERNMENT CLAUSE

This invention was made with government support under Grant No. DE-EE0005565 awarded by the Department of Energy. The Government has certain rights in this invention.

FIELD

The present disclosure relates to compensation circuits for capacitive power transfer.

BACKGROUND

Capacitive power transfer (CPT) and inductive power transfer (IPT) are two effective methods to transfer power wirelessly. The CPT technology utilizes high-frequency alternating electric fields to transfer power without direct electric connection, while the IPT system uses magnetic field to transfer power. The IPT technology has already been widely used in many applications, such as portable electronic devices, biomedical devices, and electric vehicle charging.

Compared with the IPT system, the CPT system has many advantages. Magnetic fields are sensitive to nearby metal objects and the system efficiency drops quickly with this interference. They also generate eddy current losses and, hence, heat in a conductive object, which creates a potential fire hazard. However, the electric field in the CPT system does not generate significant losses in the metal objects.

The recent CPT system can be classified by the matching network topology. The most popular topology is a single inductor resonating with the capacitor to form a simple series-resonant circuit. The second topology is the LCL structure at the front-end to step-up the voltage for the coupling capacitor. However, there is also an inductor directly connected with the capacitor to form a series resonance. In these two topologies, the series inductance is large because of the small value of capacitance. The voltage pressure on the capacitor is also large. The third topology is the resonant class E converter or the nonresonant PWM converter, used to replace the compensation inductor. All of these systems require very high capacitance values, in the tens or hundreds of nanofarad range. So, the transferred distance is usually around 1 mm.

This section provides background information related to the present disclosure which is not necessarily prior art.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
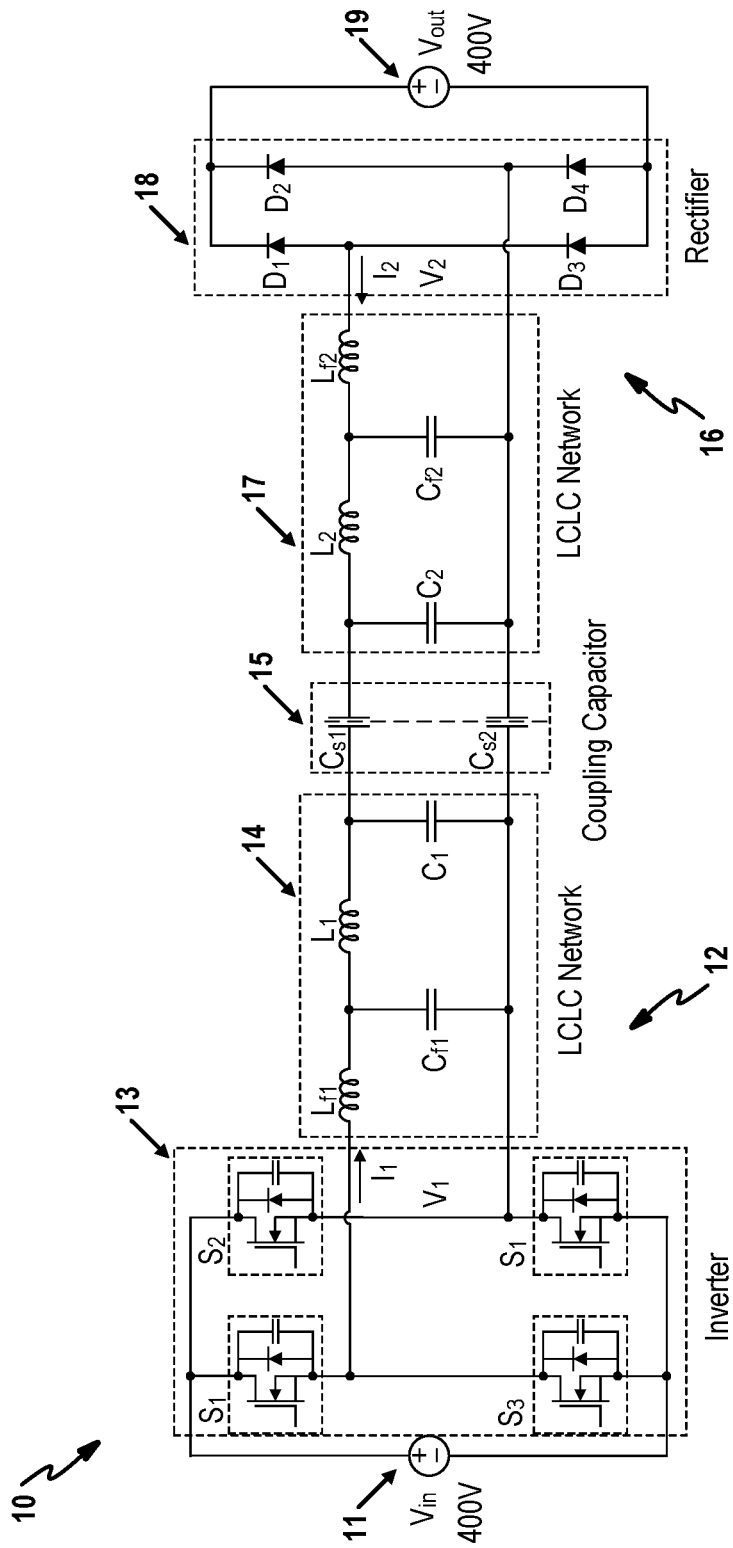
FIG. 1 is a schematic depicting an example embodiment of a double-sided LCLC compensation circuit in a wireless power transfer system.

FIG. 1 depicts an example embodiment of a double-sided LCLC compensation circuit 8 in a wireless power transfer system 10. The wireless power transfer system is comprised generally of a send unit 12, a receive unit 16 and a pair of coupling capacitors 15. In operation, the send unit 12 is configured to transfer power capacitively through the pair of coupling capacitors 15 to the receive unit 16. In one example, the receive unit 16 is integrated into a vehicle to support wireless charging of batteries therein. Other applications for the wireless power transfer system also fall within the broader aspects of this disclosure.

The send unit 12 includes an inverter 13 and a send side compensation circuit 14. The inverter 13 is configured to receive a DC input signal and converts the DC input signal to an AC input signal at a desired resonant frequency. In the example embodiment, the inverter is a full bridge converter circuit comprised of four switches. In another embodiment, the inverter may be a half-bridge converter circuit comprised of two switches. Other types of inverter circuits also fall within the scope of this disclosure.

The send side compensation circuit 14 interconnects the inverter 13 with the pair of coupling capacitors 15. Since the challenge in CPT system is brought on by the small capacitance value, one way to solve it is to connect extra capacitors in parallel with the coupling capacitor to increase the capacitance in the resonant circuit. It follows that the send side compensation circuit 14 includes at least two bypass capacitors $C_1$, $C_{f1}$, where each bypass capacitor is connected in parallel between input terminals of the pair of coupling capacitors.

In the example embodiment, the send side compensation circuit 14 is comprised of two LC circuits coupled in series. In one LC circuit, a first bypass capacitor $C_1$ is electrically coupled in parallel between input terminals of the first and second coupling capacitors $C_{s1}$, $C_{s2}$, and the output terminal of a first inductor $L_1$ is electrically coupled at a first node to an input terminal of the first coupling capacitor $C_{s1}$. In the other LC circuit, a second bypass capacitor $C_{f1}$ is also electrically coupled in parallel with the first bypass capacitor, and an output terminal of the second inductor $L_{f2}$ is electrically coupled at a second node to the input terminal of the first inductor.

The receive 16 unit includes a receive side converter 18 and a receive side compensation circuit 17. The converter 18 is configured to receive an AC charging signal from the pair of coupling capacitors 15 and converts the AC charging signal to a DC charging signal. In an example embodiment, the converter 18 is a full wave rectifier circuit although other types of converter circuits are also contemplated by this disclosure. A battery or another type of load 19 may be configured to receive the DC charging signal from the converter.

The receive side compensation circuit 17 interconnects the pair of coupling capacitors 15 with the receive side converter 18. Likewise, the receive side compensation circuit 17 includes at least two bypass capacitors $C_2$, $C_{f2}$, where each bypass capacitor is connected in parallel between output terminals of the pair of coupling capacitors.

In the example embodiment, the receive side compensation circuit 17 is symmetric with the send side compensation circuit 14. That is, the receive side compensation circuit 17 is comprised of two LC circuits coupled in series. In one LC circuit, a third bypass capacitor $C_2$ is electrically coupled in parallel between output terminals of the first and second coupling capacitors $C_{s1}$, $C_{s2}$; and the input terminal of the third inductor $L_2$ is electrically coupled at a third node to the output terminal of the first coupling capacitor $C_{s1}$. In the other LC circuit, a fourth bypass capacitor $C_{f2}$ is electrically coupled in parallel with the third bypass capacitor $C_2$; and the input terminal of the fourth inductor $L_{f2}$ is electrically coupled at a fourth node to the output terminal of the third inductor $L_2$.

First and third bypass capacitors C1 and C2 are connected in parallel with the coupling capacitors $C_{s1}$, $C_{s2}$. As long as capacitance of the first and third bypass capacitors C1 and C2 are much larger than the coupling capacitors, most of the current is bypassed by C1 and C2 to reduce the voltage stress. At the input side, the LCL topology is used to step up the voltage for the capacitor. At the output side, the other LCL topology steps down the voltage to the load.

Figure 2A:
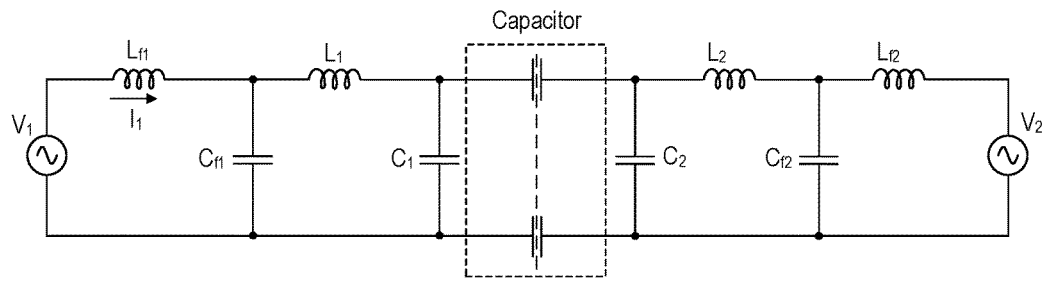
FIG. 2A is a schematic illustrating a fundamental harmonic analysis of the wireless power transfer system.

In the example embodiment, the H-bridge inverter provides square wave excitation voltage to the resonant circuit and the output side rectifier converts the AC current to DC signal to supply the load. Since the LCLC network works as a high frequency filter at both the input and output, the fundamental harmonic analysis (FHA) of the CPT system is sufficient to calculate the performance. The simplified circuit model is shown in FIG. 2A.

Figure 2B:
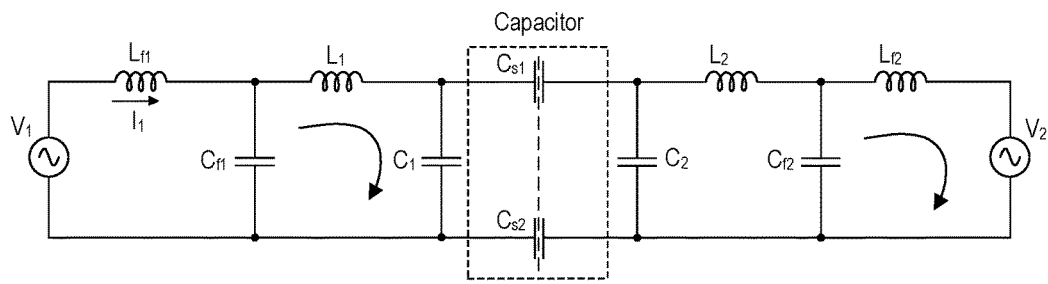
FIG. 2B is a schematic illustrating a fundamental harmonic analysis of the wireless power transfer system excited only by the input source.
Figure 2C:
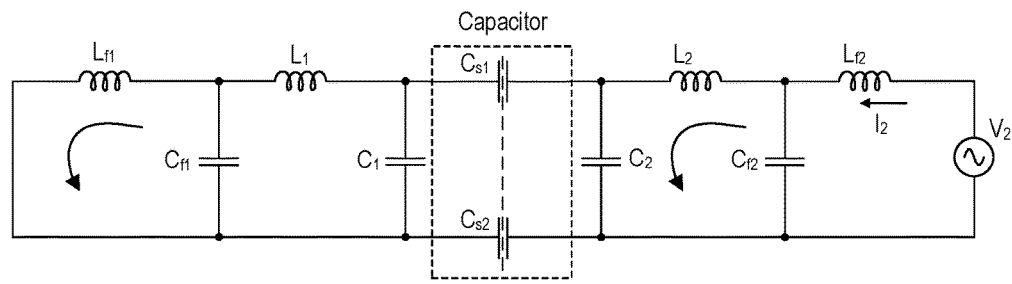
FIG. 2C is a schematic illustrating a fundamental harmonic analysis of the wireless power transfer system excited only by the output source.

Using the superposition theory, the resonant circuit can be divided into two parts as shown in FIG. 2B and FIG. 2C. FIG. 2B shows the resonance behavior in the circuit when only the input voltage $V_1$ is effective, which is defined as Mode I. FIG. 2C shows the resonance behavior in the circuit when only the output voltage $V_2$ is effective, which is defined as Mode II. Since FIG. 2A is a linear circuit, the system performance can be calculated by the add-up of FIG. 2B and FIG. 2C. Based on FIG. 2B and FIG. 2C, the parameter values satisfy the following equation (1).

$$\begin{cases} L_{f1} = 1/(\omega_0^2 C_{f1}) \\ L_{f2} = 1/(\omega_0^2 C_{f2}) \\ L_1 = 1/(\omega_0^2 C_{p1}) + L_{f1} \\ L_2 = 1/(\omega_0^2 C_{p2}) + L_{f2} \\ C_{p1} = C_1 + C_s \cdot C_2/(C_s + C_2) \\ C_{p2} = C_2 + C_s \cdot C_1/(C_s + C_1) \\ C_s = C_{s1} \cdot C_{s2}/(C_{s1} + C_{s2}) \\ \omega_0 = 2\pi \cdot f_{sw} \end{cases} \quad (1)$$

where, $f_{sw}$ is the switching frequency and $C_s$ is the series of the two coupling capacitors.

FIG. 2B shows that the output current only depends on the input voltage and the input current only depends on the output voltage. Moreover, since the H-bridge diodes rectifier is used at the secondary side, the current and voltage are in phase. FIG. 2B indicates that the output side current is 90 degree leading the input voltage, and FIG. 2C indicates that the input side current is 90 degree lagging the output voltage. Therefore, the current and voltage are also in phase with each other at the input side, which means the input side power factor is equal to 1. As a result, if the power losses in the components can be neglected, the input power can be expressed as in equation (2) as follows $$P_{in} = V_1 \cdot I_1 = \omega_0 C_s \cdot \frac{C_{f1} C_{f2}}{C_1 C_2 + C_{f1} C_s + C_{f2} C_s} \cdot V_1 \cdot V_2 \quad (2)$$

As mentioned above, $C_1$ and $C_2$ are used to bypass the current flowing through Cs. Their values should be chosen to be at least five (5) times and preferably ten (10) times capacitance of C. As a result, the output power can be estimated as in equation (3).

$$P_{in} = V_1 \cdot I_1 \approx \omega_0 C_s \cdot \frac{C_{f1} C_{f2}}{C_1 C_2} \cdot V_1 \cdot V_2 \quad (3)$$

Equation (3) shows that the input power is proportional to the coupling capacitance, input voltage, and output voltage, which makes it much easier in the system parameter design.

For illustration purposes, a 3.3 kW input power CPT charging system is designed. The coupling capacitance can be calculated as in equation (4).

$$C_{s1} = C_{s2} = \varepsilon_0 \varepsilon_r \frac{A}{d} = 8.85 \times 10^{-12} \cdot \frac{1}{0.15} = 59 \text{pF} \quad (4)$$

where, $\varepsilon_0$ is the permittivity of vacuum, $\varepsilon_r$ is the relative permittivity of air, A is the effective coupling area for each capacitor (e.g., estimated to be 1 m$^2$), and d is ground clearance of the vehicle (e.g., estimated to be 0.15 m). So the equivalent capacitance of the coupling capacitor, which is the series of $C_{s1}$ and $C_{s2}$, is calculated to be 29.5 pF.

Figure 4:
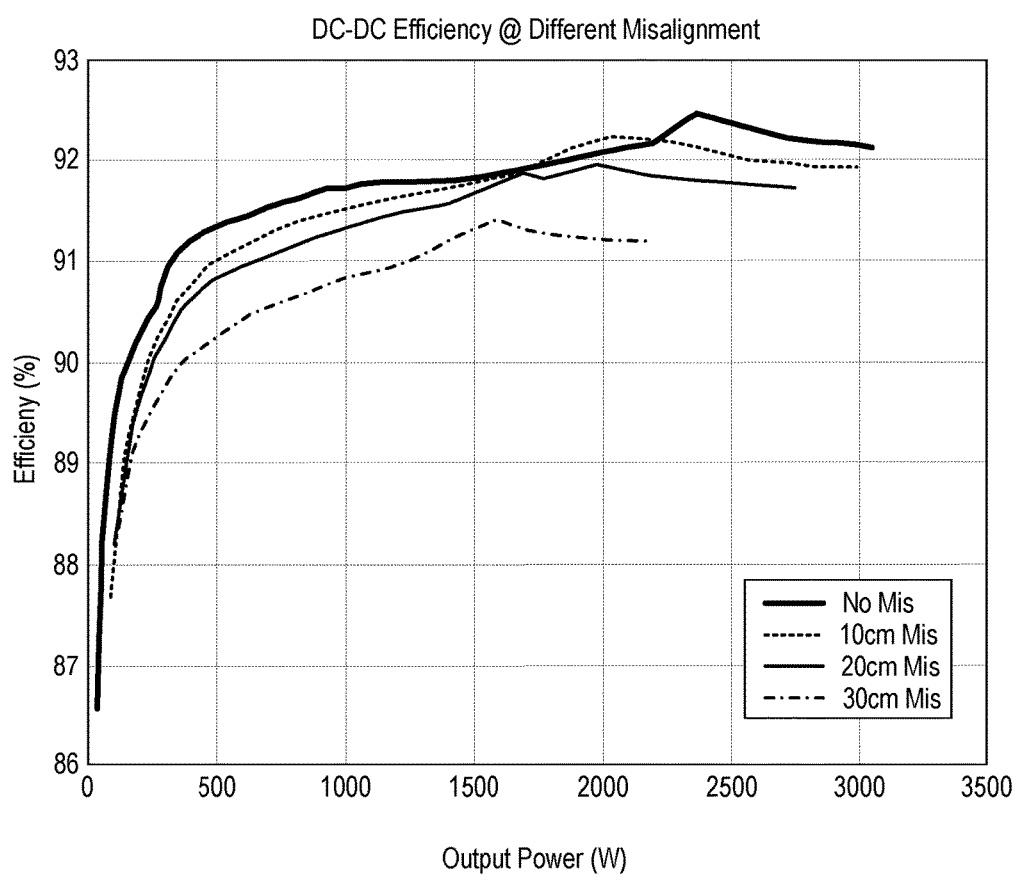
FIG. 4 is a graph showing system DC-DC efficiency of the wireless power transfer system at different misalignments.

In this example, the input and output dc voltage $V_{in}$ and $V_{out}$ are set to be 400V and the corresponding AC voltage at the input and output side are $V_1=V_2=2\sqrt{2}/\pi \times 400=360$V. The system parameters are designed to be symmetric and all the parameter values are designed according to equation (1) and (2). The parameter values are shown in Table I.

transfer (IPT) system. In a IPT system with coil size 600 mm×800 mm, the output power drops to about 50% at 310 mm misalignment. FIG. 4 also shows another benefit that the output efficiency changes a little at 10 cm and 20 cm misalignment and it drops only 1% at 30 cm misalignment case.

Figure 5A:
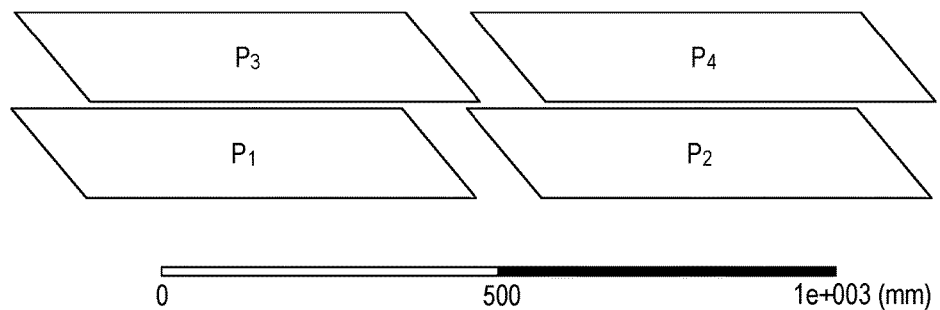
FIG. 5A is a perspective view of the plates forming the coupling capacitors.
Figure 5B:
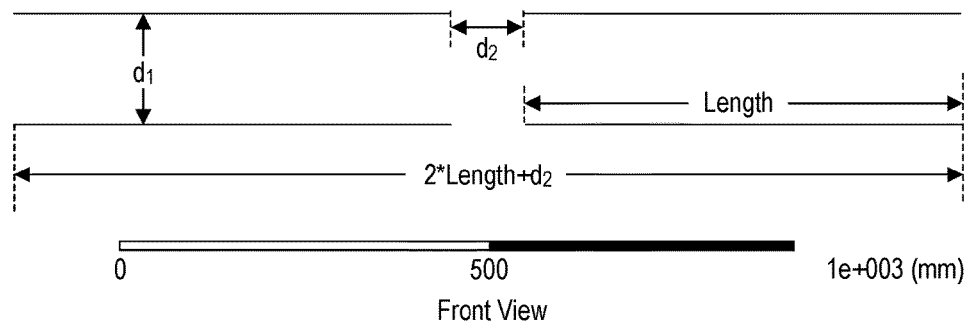
FIGS. 5B and 5C are a front view and a side view, respectively, of the plates forming the coupling capacitors.
Figure 5C:
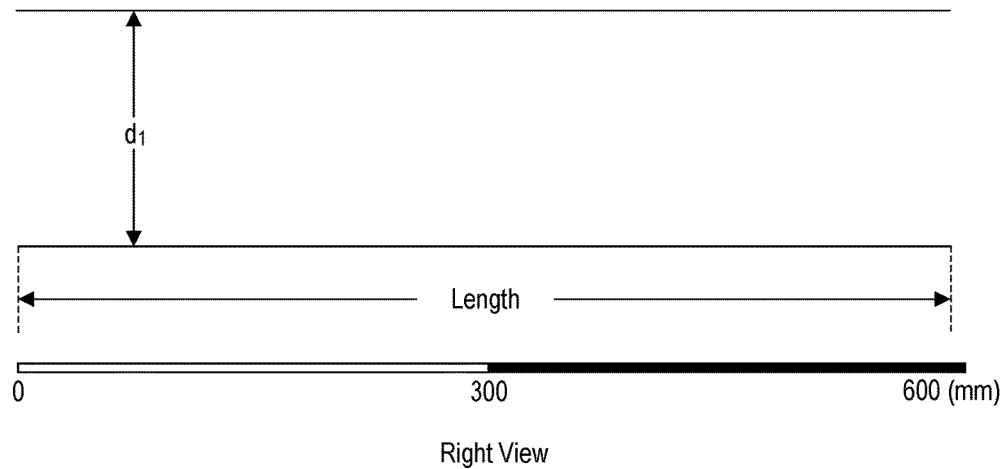
Figure 5D:
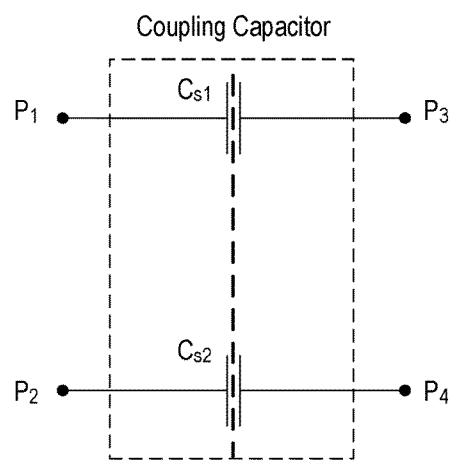
FIG. 5D is a schematic depicting the equivalent circuit of the plates forming the coupling capacitors.

In one embodiment, the first and third bypass capacitors $C_1$ and $C_2$ are designed as separated capacitors and they are not integrated with the coupling capacitors $C_{s1}$, $C_{s2}$. Thus, the coupling capacitors $C_{s1}$, $C_{s2}$ are comprised of four metal plates as shown in FIG. 5A. Example dimensions for the coupling capacitors are given in FIG. 5A-5C. It is understood that dimensions for the capacitors will vary depending on distance between plates, desired power output and other factors. An equivalent capacitor model is shown in FIG. 5D. In this model, the capacitor between P1 and P3 and the capacitor between P2 and P4 are the two coupling capacitors. When the distance $d_2$ between P1 and P2 is large enough, the other coupling between the plates can be neglected.

Figure 6A:
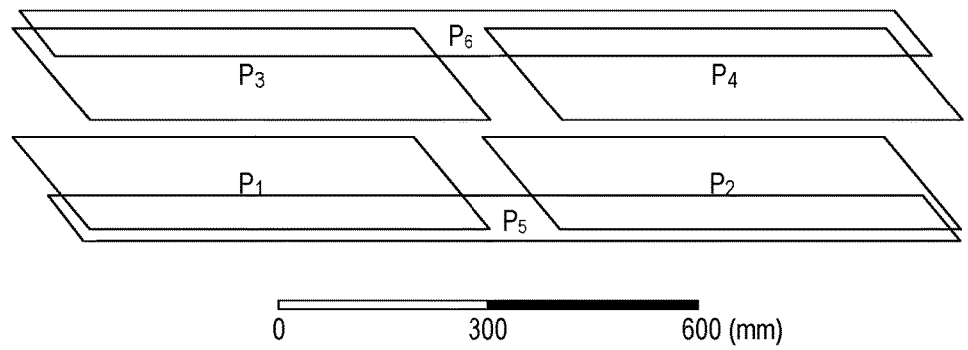
FIG. 6A is a perspective view depicting an alternative integrated structure of plates forming the coupled capacitors.

In an alternative embodiment, the first and third capacitors $C_1$ and $C_2$ are integrated with the coupling capacitors $C_{s1}$, $C_{s2}$ as shown in FIG. 6A. Example dimensions for the

TABLE I

| A 3.3 kW CPT System Parameter with 1 m$^2$/0.15 m plates | | | | | | | | | | | |
|---|---|---|---|---|---|---|---|---|---|---|---|
| $V_{in}$ | $V_{out}$ | $f_{sw}$ | $L_{f1}$ | $C_{f1}$ | $L_1$ | $C_1$ | $C_s$ | $C_2$ | $L_2$ | $C_{f2}$ | $L_{f2}$ |
| 400 V | 400 V | 1 MHz | 11.86 µH | 2.14 nF | 156.9 µH | 150 pF | 29.5 pF | 150 pF | 164.7 µH | 2.14 nF | 11.86 µH |

In table I, the inductor $L_2$ is designed to be 5% larger than $L_1$ to provide soft-switching condition to the input side H-bridge inverter. LTspice can be used to simulate the designed CPT system performance as shown in FIGS. 3A and 3B.

Figure 3A:
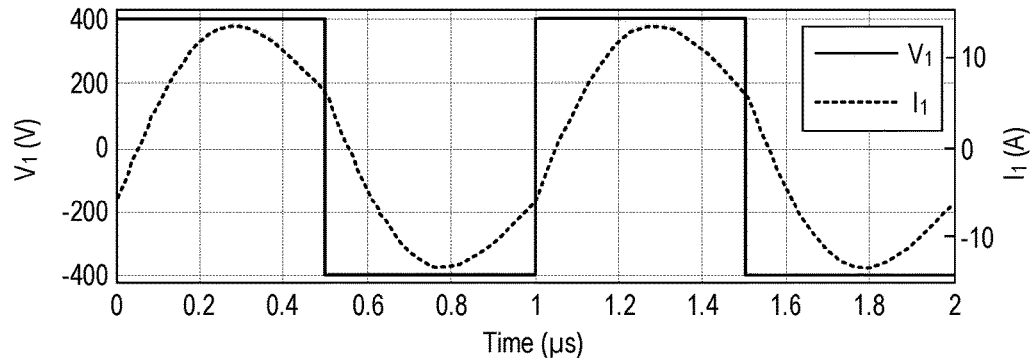
FIGS. 3A and 3B are graphs illustrating input and output voltage as well as the current waveform from a simulation of the wireless power transfer system in FIG. 1.
Figure 3B:
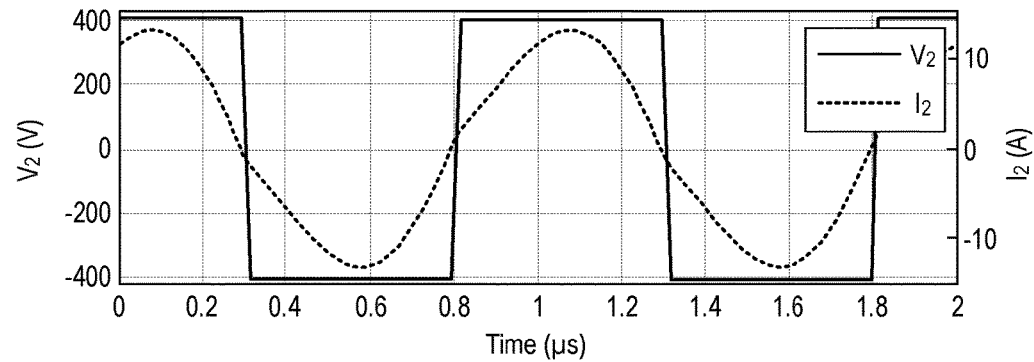

FIG. 3A shows that the input current $I_1$ is lagging the input voltage, which can maintain the soft-switching of the MOSFETs. In FIG. 3B, the output voltage is leading the input voltage, which agrees with the analysis above.

Figure 6B:
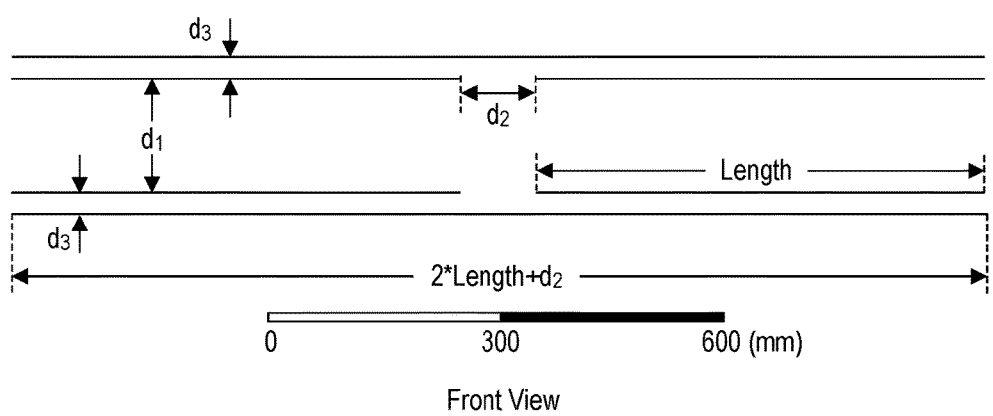
FIGS. 6B and 6C are a front view and a side view, respectively, of the integrated structure of the plates.
Figure 6C:
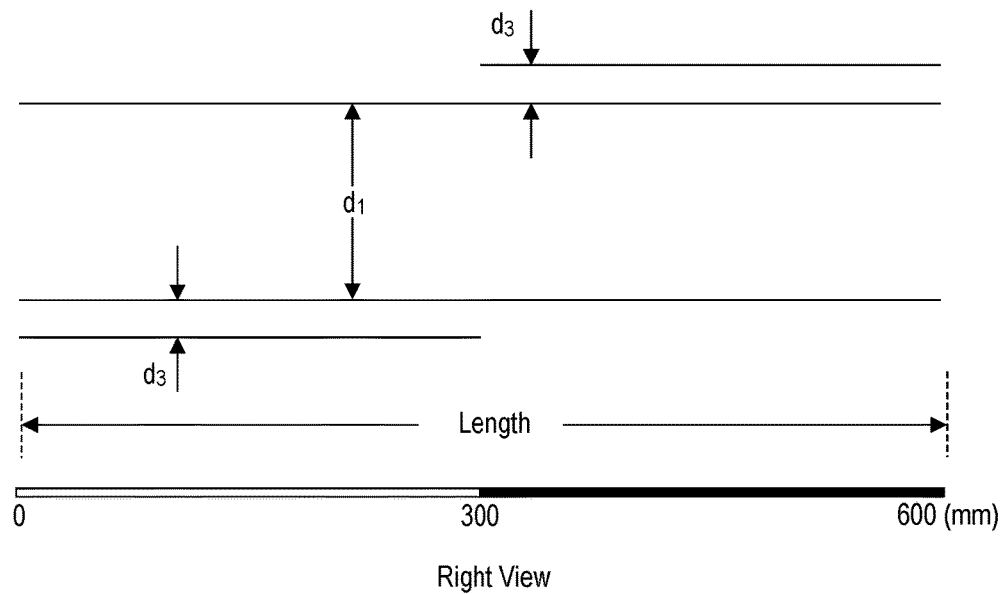
Figure 6D:
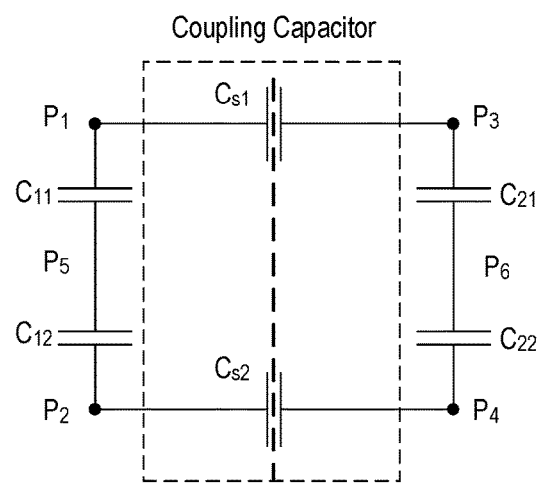
FIG. 6D is a schematic depicting the equivalent circuit of the integrated structure of plates.

In an example embodiment, since it is difficult to make four 1 m$^2$ plates to form the two capacitors, four 0.61 m×0.61 m aluminum plates are utilized and the distance is set to be 70 mm. In this embodiment, the corresponding coupling capacitor of two plates is calculated to be 47 pF and the equivalent capacitance is 23.5 pF, which is not far from the desired value of 29.5 pF. Consequently, parameters for the compensation circuit parameter are set forth in Table II.

coupling capacitors is again given in FIG. 6A-6C and an equivalent capacitor model is shown in FIG. 6D. In this integrated model, the capacitor between P1 and P3 and the capacitor between P2 and P4 are the two coupling capacitors. P5 is added at the primary side to increase the capacitance between P1 and P2. The coupling capacitor $C_{11}$ between P5 and P1 is in series with the capacitor $C_{12}$ between P5 and P2, which forms the compensation capacitor $C_1$ in FIG. 1. P6 is added at the secondary side to increase the capacitance between P3 and P4. The coupling capacitor $C_{21}$ between P6 and P3 is in series with the capacitor $C_{22}$ between P6 and P4, which forms the compensation capacitor $C_2$ in FIG. 1. Similarly, when the distance $d_2$ between P1 and P2 is large enough, the other coupling between the plates can be neglected. In this way, the external compensation capacitors C1 and C2 can be eliminated;

TABLE II

| A 3.3 kW CPT System Prototype Parameter with 0.37 m$^2$/0.07 m plates | | | | | | | | | | | |
|---|---|---|---|---|---|---|---|---|---|---|---|
| $V_{in}$ | $V_{out}$ | $f_{sw}$ | $L_{f1}$ | $C_{f1}$ | $L_1$ | $C_1$ | $C_s$ | $C_2$ | $L_2$ | $C_{f2}$ | $L_{f2}$ |
| 400 V | 400 V | 1 MHz | 10.4 µH | 2.45 nF | 145 µH | 160 pF | 23.5 pF | 160 pF | 166 µH | 2.45 nF | 10.4 µH |

FIG. 4 depicts system efficiency at different misalignments. In FIG. 4, the output power denotes the power received by the dc side load and the efficiency is from the input side dc source to the output side dc load. It is shown that there is very small power drop at 10 cm and 20 cm misalignment conditions. Even when the misalignment increases to 30 cm, which is about half of the plate size, the output power remains 70% of the no-misalignment condition. This is much better than the previous inductive power The advantage is that the system structure is more compact and less connectors are needed in the installation process.

Figure 7:
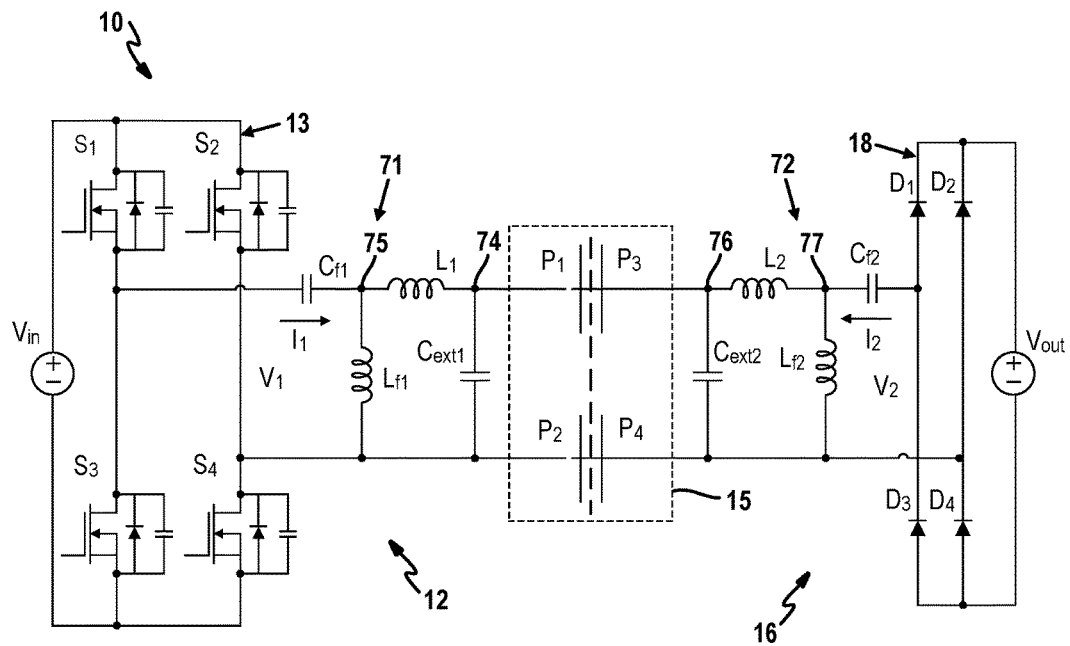
FIG. 7 is a schematic depicting an example embodiment of a double-sided CLLC compensation circuit in a wireless power transfer system.

FIG. 7 depicts another embodiment of a compensation circuit 71, 72 in a wireless power transfer system 10. As described above, the wireless power transfer system 10 is comprised generally of a send unit 12, a receive unit 16 and a pair of coupling capacitors 15. Two pairs of metal plates are used to form the two coupling capacitors in a loop to transfer power through a capacitive coupling. The compensation circuit resonates with the coupling capacitors to generate high voltage on the plates in order to achieve power transfer. On the primary side, a full bridge inverter 13 is used to provide AC excitation to the resonant tank although other types of inverters may be used as well. On the secondary side, a full-bridge diode rectifier 18 is utilized to provide dc voltage to the load although other types of rectifiers may be used as well.

In this embodiment, an CLLC topology is proposed for the compensation circuit on both the primary side and the secondary side. For the send side compensation circuit 71, a first bypass capacitor $C_{ext1}$ is electrically coupled in parallel between input terminals of the first and second coupling capacitors $C_{s1}$, $C_{s2}$, and the output terminal of a first inductor $L_1$ is electrically coupled at a first node 74 to an input terminal of the first coupling capacitor $C_{s1}$. Additionally, a second inductor $L_{f1}$ is electrically coupled in parallel with the first bypass capacitor $C_{ext1}$, and an output terminal of the second capacitor $C_{f1}$ is electrically coupled at a second node 75 to the input terminal of the first inductor $L_1$.

In this example embodiment, the receive side compensation circuit 72 is symmetric with the send side compensation circuit 71. That is, a CLLC topology also proposed for the receive side compensation circuit 72. Specifically, a third bypass capacitor $C_{ext2}$ is electrically coupled in parallel between output terminals of the first and second coupling capacitors $C_{s1}$, $C_{s2}$; and the input terminal of the third inductor $L_2$ is electrically coupled at a third node 76 to the output terminal of the first coupling capacitor $C_{s1}$. A fourth inductor $L_{f2}$ is electrically coupled in parallel with the third bypass capacitor $C_{ext2}$; and the input terminal of the fourth capacitor $C_{f2}$ is electrically coupled at a fourth node 77 to the output terminal of the third inductor $L_2$.

Figure 8:
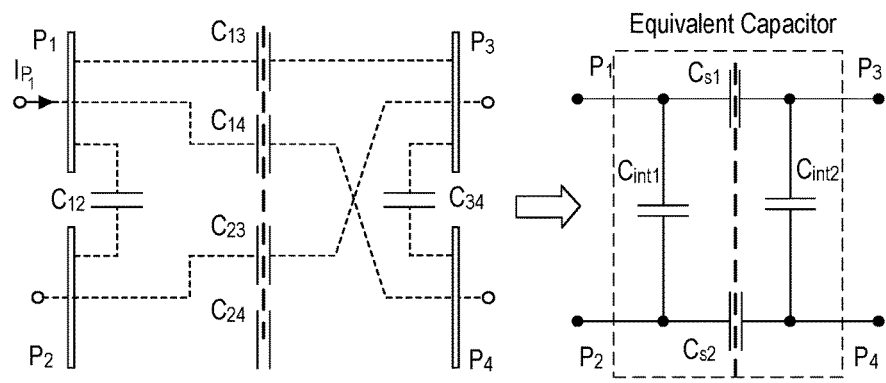
FIG. 8 is a schematic of a circuit model of the coupling plates in the wireless power system of FIG. 7.

The circuit model of the coupling plates should be derived to design the compensation circuit parameters. In one embodiment, the two pairs of plates are arranged 500 mm away from each other, and the cross-coupling between the two pairs is neglected. In this design, the couplers are placed closer together to make the system more compact. Therefore, the inter-coupling should be considered and modeled. The six coupling capacitors between the plates and the equivalent circuit model with four capacitors are shown in FIG. 8. The simplification process will be provided. If a current source IP1 is applied at the plates P1 and P2, the nodal current equation is expressed as, $$\begin{cases} (C_{12}+C_{13}+C_{14})\cdot V_{P1}-C_{13}\cdot V_{P3}-C_{14}\cdot V_{P4}=I_{P1}/(j\omega_0) \\ -C_{13}\cdot V_{P1}+(C_{13}+C_{23}+C_{34})\cdot V_{P3}-C_{34}\cdot V_{P4}=0 \\ -C_{14}\cdot V_{P1}-C_{34}\cdot V_{P3}+(C_{14}+C_{24}+C_{34})\cdot V_{P4}=0 \end{cases} \quad (5)$$

where $V_{P1}$, $V_{P2}$, $V_{P3}$, and $V_{P4}$ are the voltage on each plate ($V_{P2}=0$ is set to be the reference node), $\omega_0=2\pi f_{sw}$, $f_{sw}$ is the switching frequency, and $I_{P1}$ is the fundamental external input current flowing into $P_1$. In order to simplify the circuit model, the relationship between the plate voltage is derived.

$$\begin{cases} V_{P3}=\dfrac{C_{13}C_{14}+C_{13}C_{24}+C_{13}C_{34}+C_{14}C_{34}}{C_{34}(C_{13}+C_{14}+C_{23}+C_{24})+(C_{13}+C_{23})(C_{14}+C_{24})}\cdot V_{P1} \\ V_{P4}=\dfrac{C_{13}C_{14}+C_{14}C_{23}+C_{13}C_{34}+C_{14}C_{34}}{C_{34}(C_{13}+C_{14}+C_{23}+C_{24})+(C_{13}+C_{23})(C_{14}+C_{24})}\cdot V_{P1} \end{cases} \quad (6)$$

Considering (6) and the first equation in (5), the equivalent input capacitance, $C_{in}=I_1/(j\omega_0 V_{P1})$, seen from the $P_1$ and $P_2$ side is expressed as, $$C_{in}=C_{12}+\frac{C_{34}(C_{13}+C_{14})(C_{23}+C24)}{C_{34}(C_{13}+C_{14}+C_{23}+C_{24})+(C_{13}+C_{23})(C_{14}+C_{24})}+ \quad (7)$$

$$\frac{C_{13}C_{23}(C_{14}+C_{24})+C_{14}C_{24}(C_{13}+C_{23})}{C_{34}(C_{13}+C_{14}+C_{23}+C_{24})+(C_{13}+C_{23})(C_{14}+C_{24})}$$

For the plates, the voltage between P1 and P2 is treated as the input, and the voltage between P3 and P4 is treated as the output. The transfer function between the two voltages can be defined as H=(VP3−VP4)/VP1. Considering (6), the transfer function H is expressed as, $$H=\frac{C_{13}C_{24}-C_{14}C_{23}}{C_{34}(C_{13}+C_{14}+C_{23}+C_{24})+(C_{13}+C_{23})(C_{14}+C_{24})} \quad (8)$$

The plates structure can be designed to be symmetric between the primary and secondary sides. For the equivalent model in FIG. 8, there exists $C_{s1}=C_{s2}$, and $C_{int1}=C_{int2}$. The input capacitance and transfer function are expressed as, $$\begin{cases} C_{in}=C_{int1}+\dfrac{C_s\cdot C_{int2}}{C_s+C_{int2}} \\ H=\dfrac{Cs}{Cs+C_{int2}} \\ Cs=\dfrac{C_{s1}\cdot C_{s2}}{C_{s1}+C_{s2}} \end{cases} \quad (9)$$

The equivalent capacitors can be expressed as, $$\begin{cases} C_{int1}=C_{in}\cdot\dfrac{1}{1+H} \\ Cs=C_{in}\cdot\dfrac{H}{1-H^2} \end{cases} \quad (10)$$

Therefore, using (8), (9), and (10), the equivalent capacitor model can be derived for any given plates' dimensions.

Figure 9:
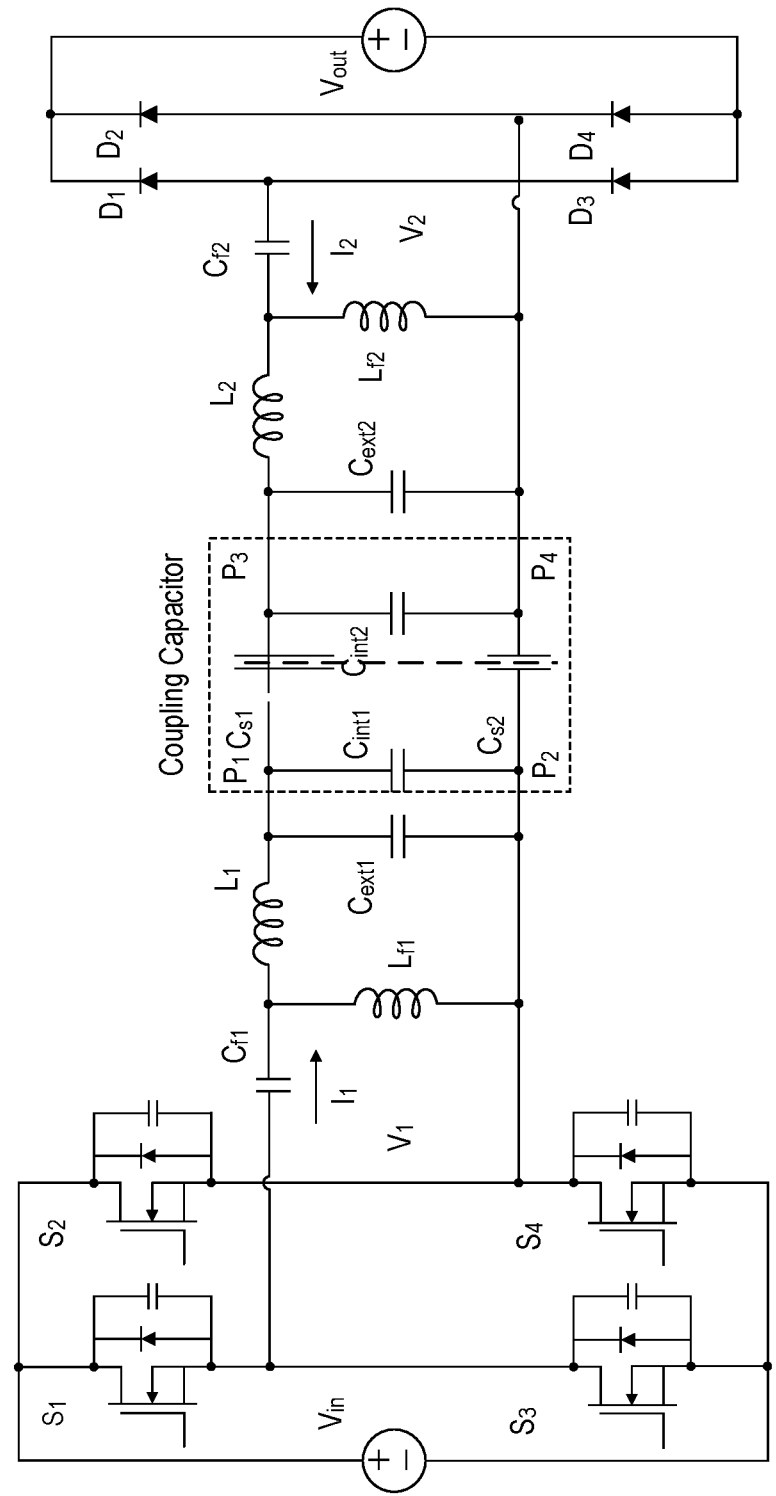
FIG. 9 is a schematic of the wireless power system of FIG. 7 with a simplified capacitor model.
Figure 10A:
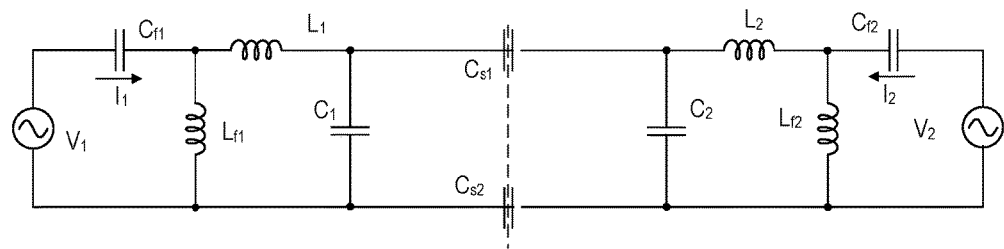
FIG. 10A is a schematic illustrating a fundamental harmonic analysis of the wireless power transfer system of FIG. 7.

Replace the four plates in FIG. 7 with the equivalent circuit model in FIG. 8. The circuit topology is re-drawn in FIG. 9. The CLLC topology is used to work with the plates. The external capacitors $C_{ext1}$ and $C_{ext2}$ are connected in parallel with the internal capacitors $C_{int1}$ and $C_{int2}$. The total compensation capacitance can be defined as $C=C_1=C_2=C_{ext1}+C_{int1}=C_{ext2}+C_{int2}$. The compensation parameters are also designed to be symmetric, then $L_f=L_{f1}=L_{f2}$, $C_f=C_{f1}=C_{f2}$. The fundamental harmonics approximation (FHA) can be used to analyze the working principle of the circuit at the resonant frequency. The input and output square wave sources are treated as sinusoidal source as shown in FIG. 10A. The superposition theorem is used to analyze the two sources separately.

Figure 10B:
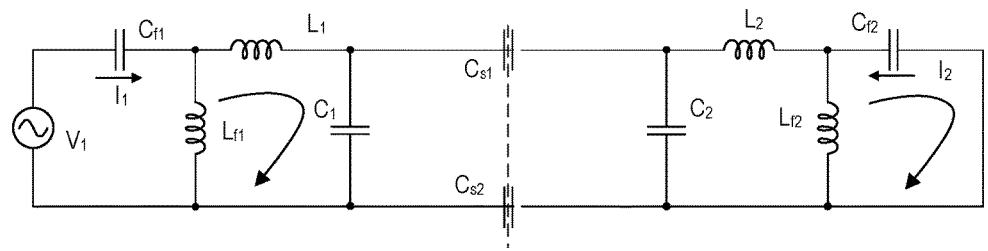
FIG. 10B is a schematic illustrating a fundamental harmonic analysis of the wireless power transfer system excited only by the input source.

FIG. 10B shows the circuit is excited only by the input source. The two resonances can be expressed as, $$\begin{cases} L_{f2} = \dfrac{1}{\omega_0^2 \cdot C_{f2}} \\ L_1 = \dfrac{1}{\omega_0^2 \cdot C_{in}} - L_{f1} \end{cases} \quad (11)$$

The output current on $C_{f2}$ can be expressed as, $$I_2 = \frac{L_{f1} + L_1}{L_{f1}} \cdot \frac{C_s}{C_s + C_2} \cdot \frac{V_1}{j\omega_0 L_{f2}} \quad (12)$$

Figure 10C:
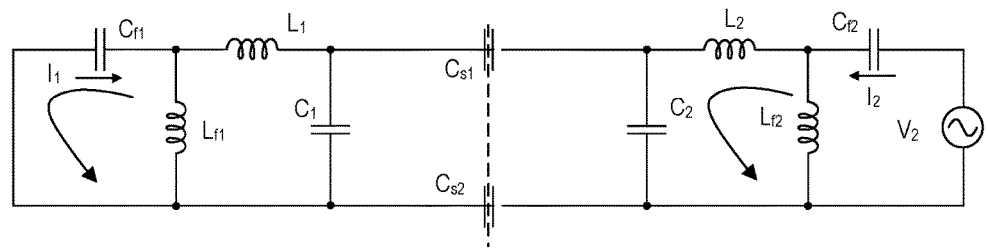
FIG. 10C is a schematic illustrating a fundamental harmonic analysis of the wireless power transfer system excited only by the output source.

Similarly, FIG. 10C shows the circuit is excited only by the output source. The two resonances can be expressed as, $$\begin{cases} L_{f1} = \dfrac{1}{\omega_0^2 \cdot C_{f1}} \\ L_2 = \dfrac{1}{\omega_0^2 \cdot C_{in}} - L_{f2} \end{cases} \quad (13)$$

Also, the input current on $C_{f1}$ can be expressed as, $$I_1 = \frac{L_{f2} + L_2}{L_{f2}} \cdot \frac{C_s}{C_s + C_1} \cdot \frac{V_2}{j\omega_0 L_{f1}} \quad (14)$$

Since a full-bridge diode rectifier is used on the secondary side, the output voltage and current are in phase with each other. Considering equations (11)-(14), the output power can be expressed as, $$P_{out} = |V_2| \cdot |-I_2| = \frac{\omega_0 \cdot C_s \cdot C_{f1} C_{f2}}{C_1 C_2 + C_1 C_s + C_2 C_s} \cdot |V_1| \cdot |V_2| \quad (15)$$

As compared to the double-sided LCLC topology described above, the output power of the CLLC compensated system is the same as that of the LCLC system. The inductances of $L_1$ and $L_2$ can be reduced to make it easier to implement them.

Figure 11A:
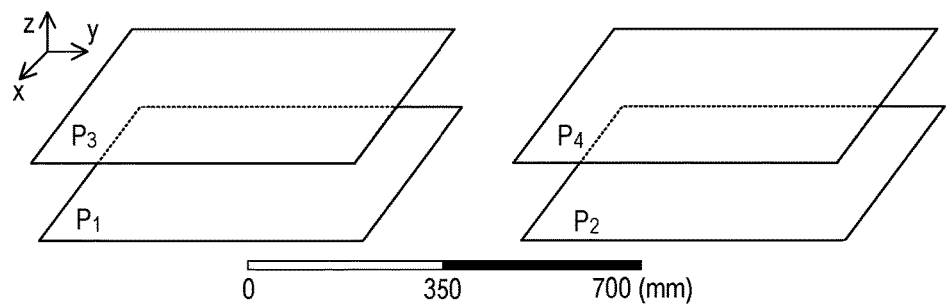
FIG. 11A is a perspective view of the plates forming the coupling capacitors in the wireless power transfer system of FIG. 7.
Figure 11B:
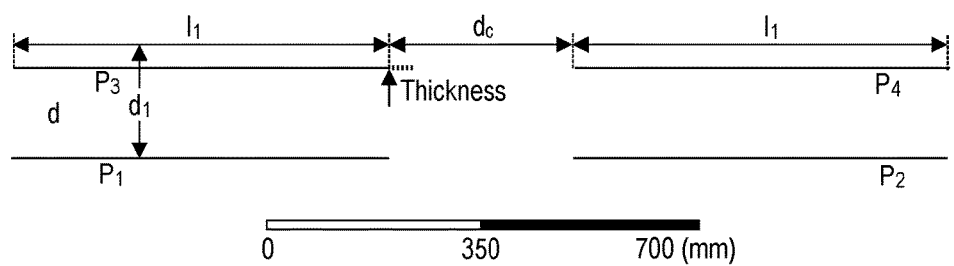
FIG. 11B is a front view of the plates forming the coupling capacitors in the wireless power transfer system of FIG. 7.

Dimensions for an example embodiment of the capacitive coupler are shown in FIGS. 11A and 11B. The area of the plate determines the coupling capacitance. Although different shapes are contemplated, each plate has a square shape, while the length $l_1$ is 24 in (610 mm). The two pairs are separated, and the distance between them, $d_c$, is 300 mm. The air gap, d, is 150 mm. The thickness of the plates does not relate to the coupling capacitance and it is set to be 2 mm.

Figure 12A:
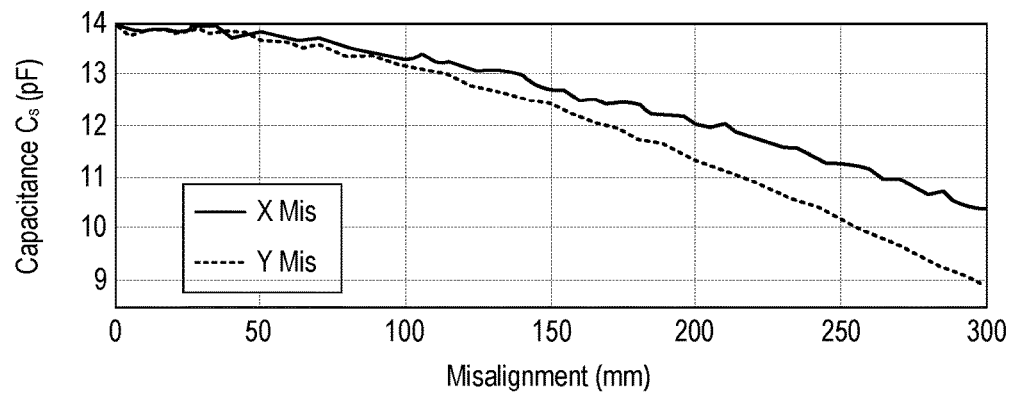
FIGS. 12A and 12B are graphs depicting capacitance value at different misalignment conditions.
Figure 12B:
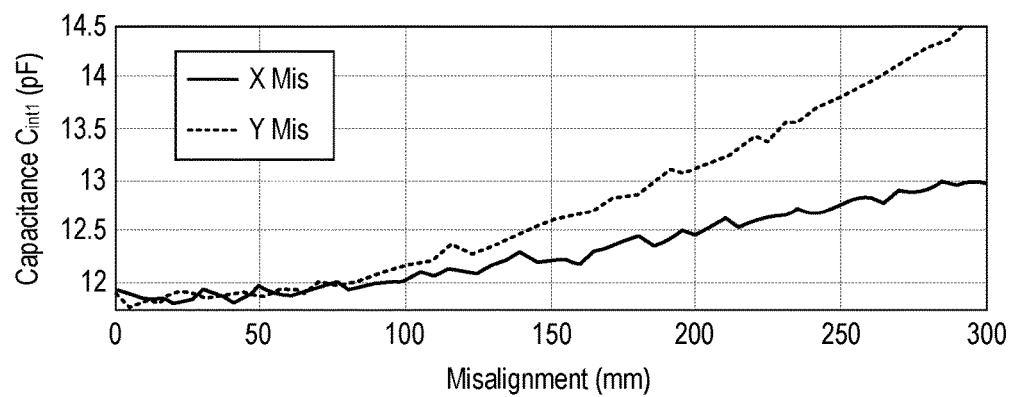

Finite element analysis (FEA) by Maxwell is used to determine the capacitance matrix that contains the coupling capacitance between each pair of plates. Based on the FEA results, the equivalent capacitances, $C_{int1}$, $C_{int2}$, $C_{s1}$, and $C_{s2}$ can be calculated using equations (7)-(10). The misalignment ability is also an important design specification. The X, Y, and Z directions are indicated in FIG. 11A. When there is misalignment in either X or Y direction, the variation of the coupling capacitance is as shown in FIGS. 12A and 12B. It shows that $C_s$ decreases with the increasing misalignment. Since equation (15) shows that the system output power is proportional to $C_s$, it means the system power will decrease with misalignment. For the other capacitor, $C_{int1}$, which is used to resonate with $L_1$, its value increases with misalignment. However, its variation is relatively small and its influence on the system power can be neglected. When comparing the X and Y direction misalignments, FIGS. 12A and 12B also show that the capacitances are more sensitive to Y direction misalignment.

Figure 13A:
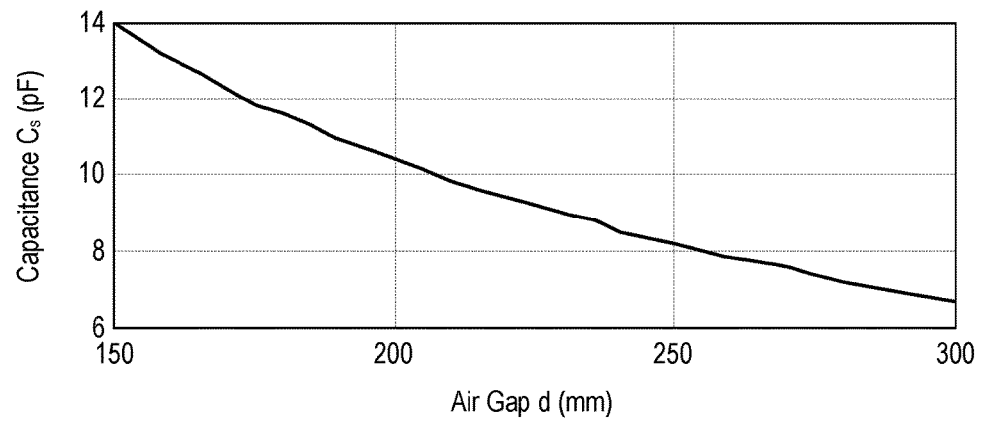
FIGS. 13A and 13B are graphs depicting capacitance value at different air gap conditions.
Figure 13B:
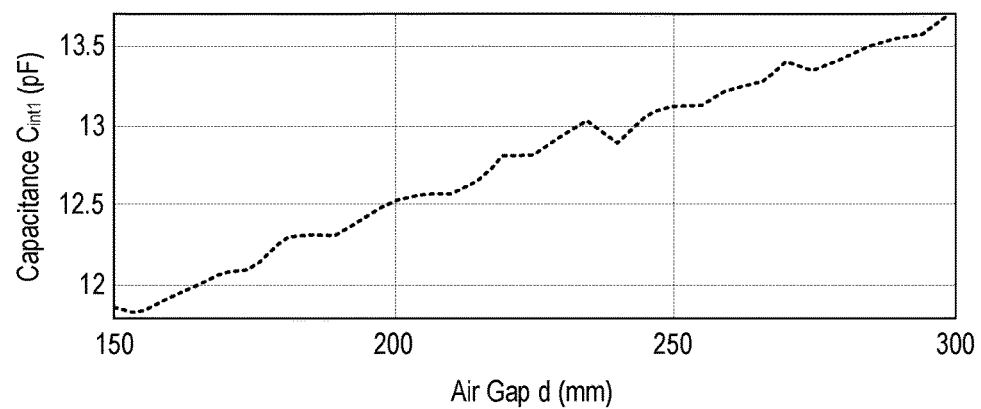

The variation of air gap distance is also studied, and the capacitances are shown in FIGS. 13A and 13B. FIG. 13A shows that when the air gap distance increases from 150 mm to 300 mm, the coupling capacitance, $C_s$ reduces by one half, which means that the system power will also reduce by half. The other capacitance, $C_{int1}$ is not sensitive to the air gap variation, hence it only changes by about 15%.

After the coupler structure and compensation circuit topology have been designed in the previous sections, a 2.9 kW input power CLLC-compensated CPT system is designed according to the power requirement in equation (15). The parameter values are calculated using equations (11) and (13). All the system specifications and circuit parameter values are shown in Table 3 below.

TABLE 3

System Specifications and Circuit Parameters

| Parameter | Design Value | Parameter | Design Value |
|---|---|---|---|
| $V_{in}$ | 400 V | $V_{out}$ | 450 V |
| $l_1$ | 610 mm | d | 150 mm |
| $f_{sw}$ | 1 MHz | $C_s$ | 14.0 pF |
| $L_{f1}$ | 11.76 μH | $L_{f2}$ | 11.76 μH |
| $C_{f1}$ | 2.15 nF | $C_{f2}$ | 2.15 nF |
| $L_1$ | 164.0 μH | $L_2$ | 165.8 μH |
| $C_1$ | 130 pF | $C_2$ | 130 pF |

The input dc voltage is 400 V, and the output dc voltage is 450V to represent the battery pack on the vehicle side. Since the system power is proportional to the switching frequency, the frequency is set to be 1 MHz to increase the output power. Compared to double-sided LCLC topology described above, compensation inductor $L_1$ is decreased from 231 μH to 164 μH, which is easier to make in practice. It also needs to be emphasized that inductor $L_2$ is designed to be larger than $L_1$ to provide soft-switching condition to the input side inverter.

In another aspect of this disclosure, a capacitive-coupled roadway power electric vehicle system 100 is presented. The capacitive-coupled roadway power electric vehicle system 100 includes: (1) an electric vehicle (EV); and (2) a roadway network over which the vehicle travels. The electric vehicle includes onboard energy storage devices that can rapidly recharged or energized with energy obtained from an electrical current. The electric vehicle further includes an energy receiving device. The energy storage device of the vehicle will be charged while the vehicle is in operation. The roadway network includes a network of roadway electric power sending modules that have been electrified with a multiplicity of roadway power segments embedded in or on the roadway. The EV can be recharged while the EV is moving on the roadway. As the vehicle passes over such capacitive-coupling power sending roadway, electric power is coupled to the electric vehicle through the sending plates in the roadway to the receiving plates mounted on the chassis of the vehicle through the electric field.

Figure 14:
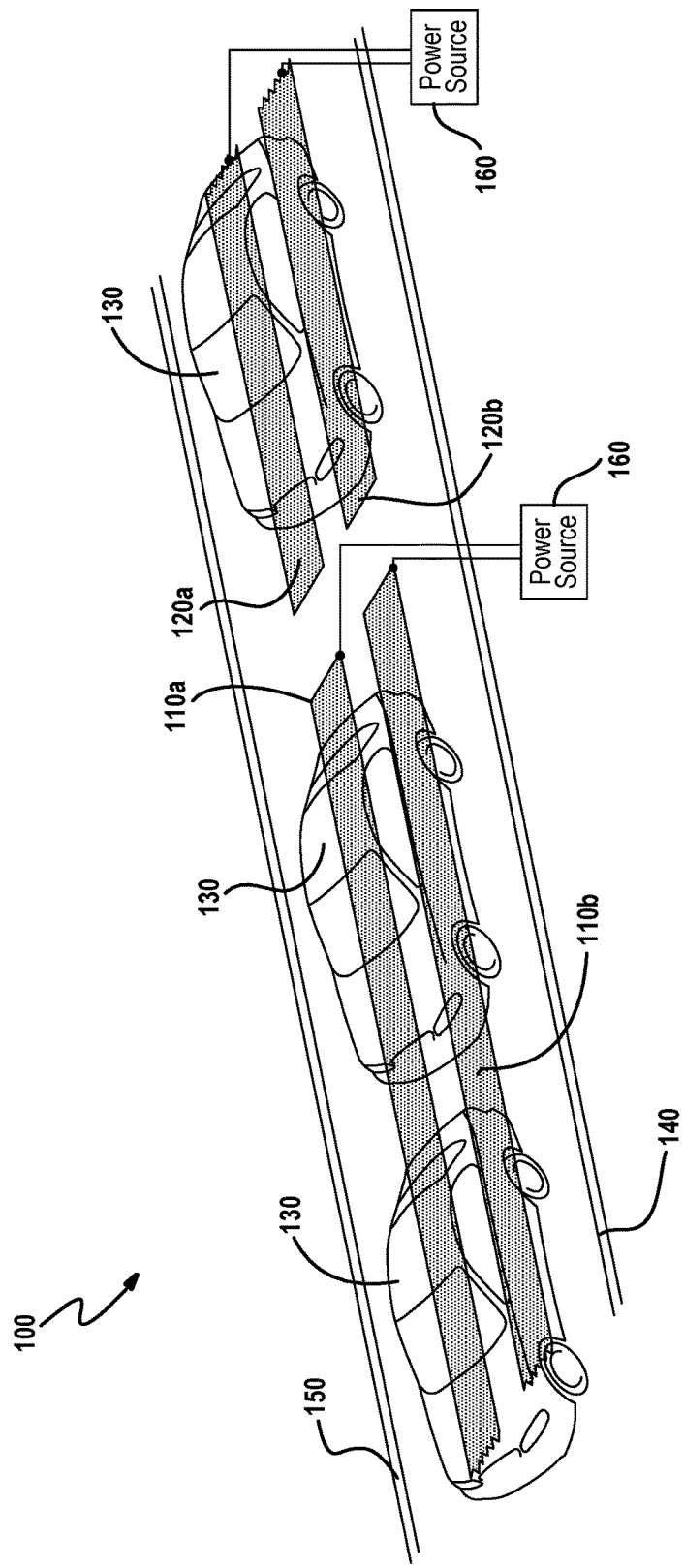
FIG. 14 is a diagram of a capacitive-coupled roadway power electric vehicle system.

Referring to FIG. 14, an electric vehicle (EV) 130 is shown traversing in a capacitive-coupled roadway power system 100 with power sending plates thereon made in accordance with the present disclosure. As illustrated in FIG. 1, the electric vehicle 130 is of a conventional form having a conventional wheel system for support of the vehicle 130 above the road surface. In one embodiment, the roadway energy sending part includes a pair of road surface mounted metal plates with high conductivity 110a, 110b. The two sending plates are distributed between the left edge of the road 140 to the right edge of the road 150. There should be some distance between one pair of sending plates. The sending plates are separated into segments 110, 120 that are preferably disposed parallel to the direction of travel of a vehicle, such as vehicle 130, on the powered roadway system.

In one embodiment, the roadway power EV system 100 has one power source 160 for each power sending segment. Each power sending segment 110, 120 can power one or more EVs 130. The power requirement of each segment is decided by the number of vehicles 130 capacitively coupled to the segment. In other embodiments, a power source may power multiple road segments.

Figure 15:
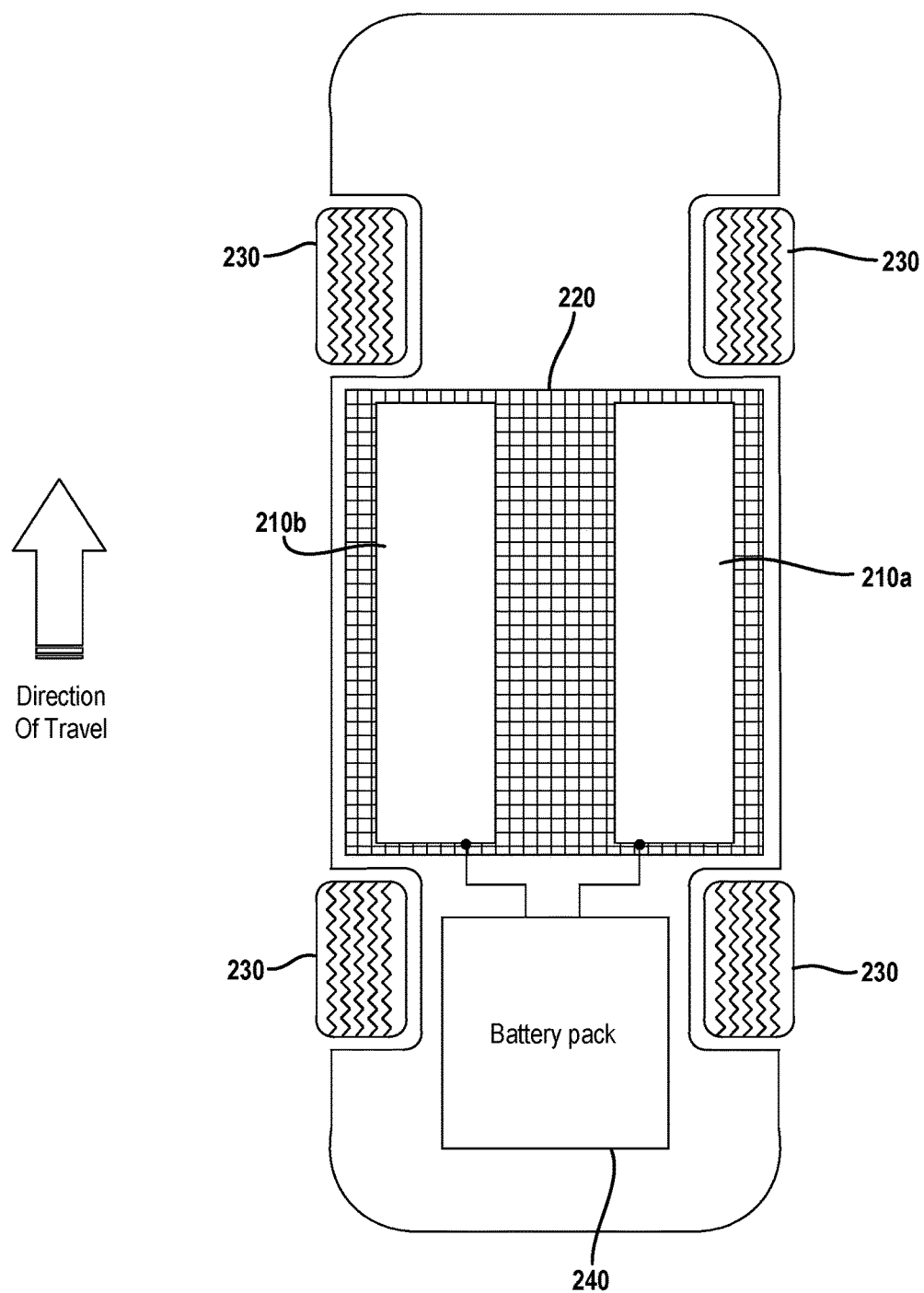
FIG. 15 is a diagram of bottom of an electric vehicle equipped for use in the roadway power electric vehicle system.

A bottom view of the receiving plates mounted on the chassis of an electric vehicle is illustrated in FIG. 15. In one embodiment, the energy receiving part on the vehicle chassis includes a pair of plates 210a, 210b with the material of high conductivity that are distributed in either side of a central axis of the EV chassis. There should be some distance between the pair of receiving plates 210a, 210b. Since the majority of EV chassis contains metal material, a layer of isolation material 220 with high resistivity to electric field is placed in between the vehicle chassis and the pair of power receiving plates. The time varying electric field sent by the sending plate 110a, 120a on the roadway surface is received by the receiving plate 210a, 210b on the vehicle chassis, to charge the onboard energy storage device 240. Because of the existence of the isolation material 220, the electric field 130 is obstructed from being received by the vehicle chassis.

Figure 16A:
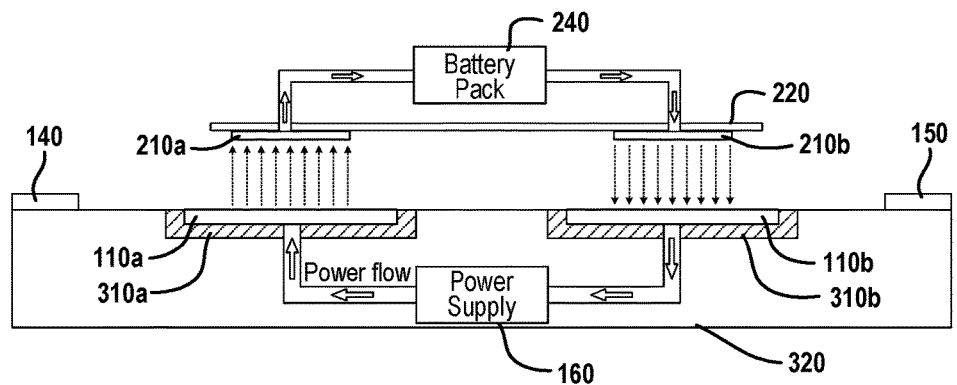
FIGS. 16A and 16B are cross-sectional views of the capacitive-coupled roadway power electric vehicle system with the vehicle aligned and misaligned, respectively.
Figure 16B:
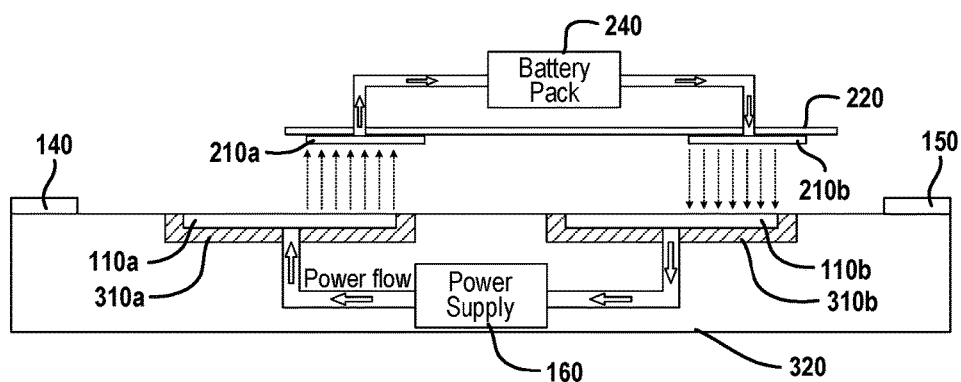

A cross-sectional view of the capacitive-coupled roadway power EV system 100 is illustrated in FIGS. 16A and 16B. When an electric vehicle moves into the electric field, the pair of power receiving plates 210a, 210b provides a low impedance path for the electric field derived from the roadway sending plates 110a, 110b, and the power flow is transferred through the time varying electric field from the sending plate 110a, 110b to the receiving plate 210a, 210b, which build up as two parallel plate capacitors. The electric power received through the onboard plate 110a, 110b is delivered eventually to the onboard energy storage system 240 (e.g., battery packs). The electric power is generated from the power supply module 160 (e.g., an AC voltage is applied to the pair of sending plates 210a, 210b). The voltage difference applied on the pair of sending plates 210a, 210b is controlled as a constant value, therefore, for the scenario where two or more EVs 130 are driving on one segment, each EV 130 can receive an induced current on its receiving plate 110a, 110b to charge the vehicle battery 240. The charging status of one EV 130 will not influence the voltage difference applied on the pair of sending plates 210a, 210b, which is controlled to be constant. In this way, the charging status of one electric vehicle will not influence the power receiving status of another electric vehicle.

The operating frequency of capacitive-coupled roadway power EV system is the dominant system parameter which affects the size, weight, cost and system efficiency. The system operating frequency should be much higher than the universal industrial and household frequency (i.e., 50 or 60 Hz). With higher operating frequency, the reactive power stored in the two parallel plate capacitors formed by the pair of sending and receiving plates is larger with a fixed size of the plates, more energy is delivered to the EV. Conversely, to deliver sufficient electric power to a moving EV 130, the system size is smaller by adapting higher operating frequency. Although not limited hereto, the preferred operating frequency of a capacitive-coupled roadway power EV system is 20 kHz to 10 MHz. This operating frequency range is made with consideration to both the size of the system and the ability of the high power switching components.

With continued reference to FIG. 16A, it is seen that an insulation material 310a, 310b with high electric resistivity is applied between the road surface sending plate 110a, 110b and the roadway, for example consisting mainly of asphalt 320. The roadway insulation material 310a, 310b can prevent the electric field generating by the sending plate 110a, 110b to be received by the metallic material in the asphalt 320. If the electric vehicle 130 is not driving along the center line of the roadway, it can still receive a portion of the rated power capacity as seen in FIG. 16B.

Figure 17:
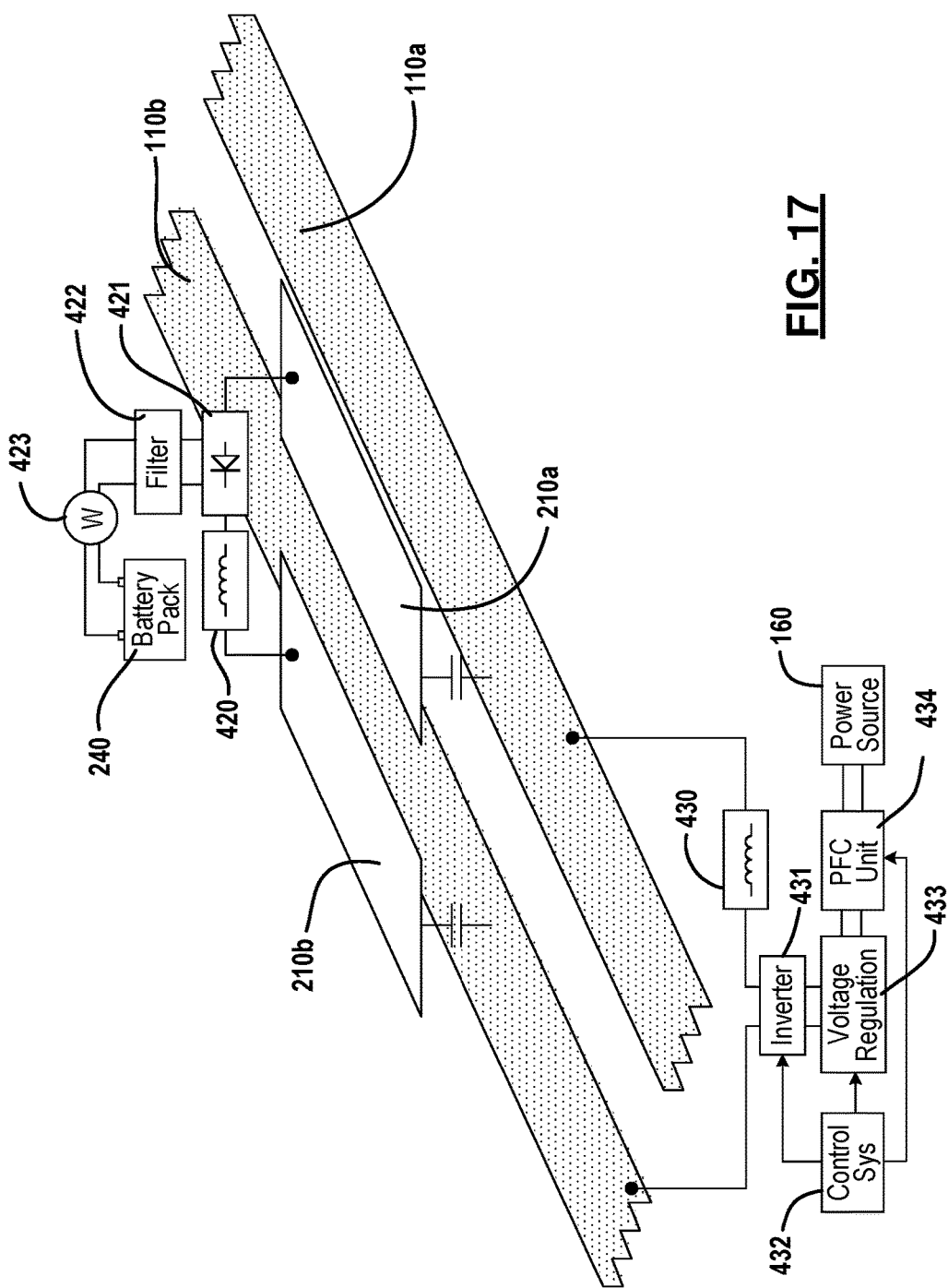
FIG. 17 is a block diagram of an example embodiment of the capacitive-coupled roadway power electric vehicle system.

In FIG. 17, there is shown a block diagram of the capacitive-coupled roadway power EV system 100 made in accordance with the present disclosure. The roadway power sending plates 110a, 110b receives the electric power eventually from the power source 160, which is usually a utility power distribution system, such as is provided by a public utility company. Typically, the utility company provides electrical power to most customers as 3-phase 60 Hz power, at 220 VAC. In this embodiment, the power factor correction (PFC) unit 434 minimizes the reactive power generated by the system, and converts the 50 or 60 Hz AC voltage to a DC voltage. The DC voltage is then converted to the desirable voltage level by the voltage regulation unit 433. The DC voltage is converted to high frequency AC voltage with the inverter 431.

The voltage across the pair of power sending plates 110a, 110b is monitored and controlled to be constant. It is realized by the control system 432 to detect the voltage difference on the two sending plate 110a, 110b and then control the voltage regulation unit 433 to maintain the constant voltage difference across the two sending plates 110a, 110b.

The coupling between the pair of sending plates 110a, 110b and the pair of receiving plates 210a, 210b is referred to as capacitive coupling by electric field. The sending and receiving plates act as parallel plate capacitors. It is not the same type of coupling that occurs in a transformer, which is an inductive coupling where the electric power is stored and transferred using the magnetic field. Therefore, the magnetic field radiation to human tissue and other electronic devices for a capacitive-coupled roadway power EV system is much less than an inductive coupled system.

The electric power received on the two receiving plates 210a, 210b is AC current. It is turned to DC current by the rectifier unit 421 and the electric filter 422. The DC current is then used to charge the onboard energy storage device 240.

The onboard power meter 423 can accurately measure the received power of the electric vehicle. The power meter 423 is coupled to a display panel inside the EV, or can be assembled as part of the dashboard panel of the EV. It provides information to a driver of the vehicle such that the battery information, charging status and cost of the received power, and the like. The driver can turn on and off of the power receiving module in the electric vehicle. In addition, the instantaneous power is also displayed on the panel. If the instantaneous power is lower than the rated value, this means that the vehicle is driving deviate from the center line of the roadway and the panel will send a warning message to the driver when the power received is lower than the rated power, so that the driver can adjust the position of the EV according to the warning. In one embodiment, the instantaneous power information of the power meter 423 is coupled to the automatic steering system that can adjust the EV's position with the assistant steering system.

Compensation network 430 comprising series connected, or parallel, or series-parallel connected inductors and/or capacitors is electrically connected to one of the sending plates 120a, to resonant with the equivalent capacitance between the sending plates 120 and the receiving plates 210, reducing the reactive power of the circuit. Compensation network 420 comprising series connected, or parallel, or series-parallel connected inductors and/or capacitors, electrically connected to one of the receiving plates 210b is resonant with the equivalent capacitance between the sending plates 120 and the receiving plates 210, maximizing the power transfer capability. In one embodiment, the compensation networks 420, 430 are implemented as either the LCLC topology or the CLLC topology described above. Other topologies are also contemplated with the broader aspects of the capacitive-coupled roadway power electric vehicle system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A compensation circuit for a capacitive power transfer system having a first coupling capacitor and a second coupling capacitor, comprising:
   a first bypass capacitor electrically coupled in parallel with input terminals of the first and second coupling capacitors;
   a first inductor having an input terminal of the first inductor and an output terminal of the first inductor, wherein the output terminal of the first inductor is electrically coupled at a first node to the input terminal of the first coupling capacitor;
   a second inductor having an input terminal of the second inductor and an output terminal of the second inductor, wherein the output terminal of the second inductor is electrically coupled at a second node to the input terminal of the first inductor;
   a second bypass capacitor electrically coupled in parallel with the first bypass capacitor, wherein one terminal of the second bypass capacitor is electrically coupled to the second node, a third bypass capacitor electrically coupled in parallel between output terminals of the first and second coupling capacitors;
   a third inductor having an input terminal of the third inductor and an output terminal of the third inductor, wherein the input terminal of the third inductor is electrically coupled at a third node to the output terminal of the first coupling capacitor;
   a fourth inductor having an input terminal of the fourth inductor and an output terminal of the fourth inductor, wherein the input terminal of the fourth inductor is electrically coupled at a fourth node to the output terminal of the third inductor; and
   a fourth bypass capacitor electrically coupled in parallel with the third bypass capacitor, wherein one terminal of the fourth bypass capacitor is electrically coupled to the fourth node.

2. The compensation circuit of claim 1 wherein capacitance of the first bypass capacitor and capacitance of the second bypass capacitor are at least five times larger than capacitance of each of the coupling capacitors.

3. A wireless power transfer system, comprising:
   a pair of coupling capacitors, each coupling capacitor having an input terminal and an output terminal;
   a send unit configured to transfer power capacitively through the pair of coupling capacitors, wherein the send unit includes:
   an inverter configured to receive a DC input signal and operates to convert the DC input signal to an AC input signal at a desired resonant frequency;
   a send side compensation circuit interconnecting the inverter with the pair of coupling capacitors, wherein the send side compensation circuit includes:
   a first bypass capacitor electrically coupled in parallel between input terminals of the pair of coupling capacitors;
   a first inductor having an input terminal of the first inductor and an output terminal of the first inductor, wherein the output terminal of the first inductor is electrically coupled at a first node to the input terminal of one of the pair of coupling capacitors;
   a second inductor having an input terminal of the second inductor and an output terminal of the second inductor, wherein the output terminal of the second inductor is electrically coupled at a second node to the input terminal of the first inductor; and
   a second bypass capacitor electrically coupled in parallel with the first bypass capacitor, wherein one terminal of the second bypass capacitor is electrically coupled to the second node
   a receive unit configured to receive power via the pair of coupling capacitors from the send unit, wherein the receive unit includes
   a receive side converter configured to receive an AC charging signal from the pair of coupling capacitors and convert the AC charging signal to a DC charging signal; and
   a receive side compensation circuit interconnecting the pair of coupling capacitors with the receive side converter;
   a third bypass capacitor electrically coupled in parallel between output terminals of the first and second coupling capacitors;
   a third inductor having an input terminal of the third inductor and an output terminal of the third inductor, wherein the input terminal of the third inductor is electrically coupled at a third node to the output terminal of the first coupling capacitor;
   a fourth inductor having an input terminal of the fourth inductor and an output terminal of the fourth inductor, wherein the input terminal of the fourth inductor is electrically coupled at a fourth node to the output terminal of the third inductor; and
   a fourth bypass capacitor electrically coupled in parallel with the third bypass capacitor, wherein one terminal of the fourth bypass capacitor is electrically coupled to the fourth node.

4. The wireless power transfer system of claim 3 wherein capacitance of the first bypass capacitor and capacitance of the second bypass capacitor are at least five times larger than capacitance of each of the coupling capacitors.

5. The wireless power transfer system of claim 3 wherein the inverter is further defined as a full bridge converter circuit comprised of four switches or a half-bridge converter circuit comprised of two switches.

6. The wireless power transfer system of claim 5 further comprises a controller electrically coupled to the four switches and operates to turn the switches on and off at a zero voltage switching condition.

7. The wireless power transfer system of claim 3 wherein the receive side converter is further defined as a full wave rectifier circuit.

8. The wireless power transfer system of claim 3 wherein the receive unit is integrated into a vehicle.

\* \* \* \* \*